N. B. SHERWOOD.
Car-Seat and Couch.
No. 204,848.  Patented June 11, 1878.
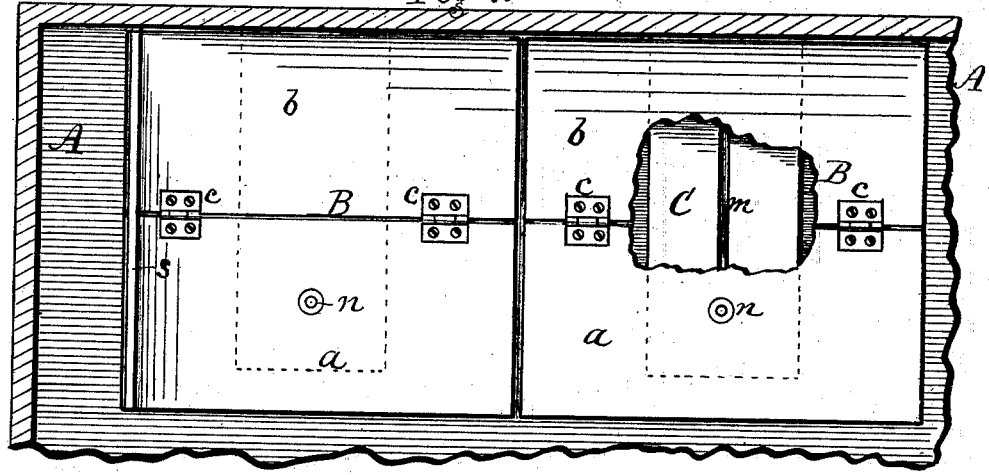
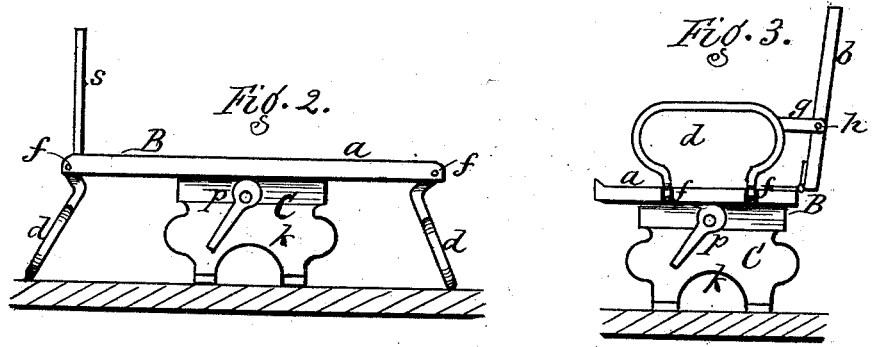
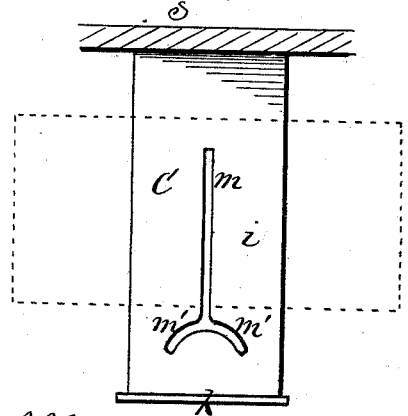
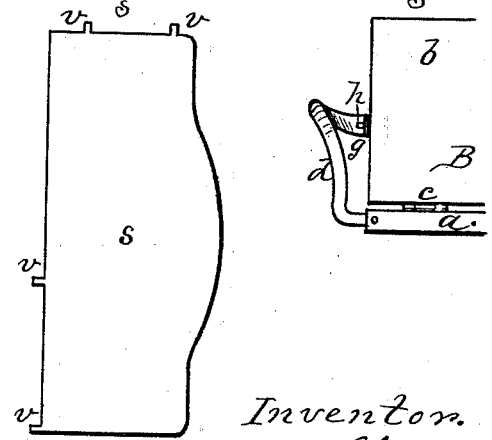
Attest.
R. E. White
F. A. Hitchcock
Inventor.
Norman B. Sherwood
per R. F. Osgard
Atty.

UNITED STATES PATENT OFFICE.

NORMAN B. SHERWOOD, OF SARATOGA SPRINGS, N. Y., ASSIGNOR OF ONE-HALF HIS RIGHT TO GEORGE H. RICE, OF WORCESTER, MASS.

IMPROVEMENT IN CAR SEATS AND COUCHES.

Specification forming part of Letters Patent No. 204,848, dated June 11, 1878; application filed September 29, 1877.

*To all whom it may concern:*

Be it known that I, NORMAN B. SHERWOOD, of Saratoga Springs, in the county of Saratoga and State of New York, have invented a certain new and useful Improvement in Car-Seats; and I do hereby declare that the following is a full, clear, and exact description of the construction and operation of the same, reference being had to the accompanying drawing, in which—

Figure 1 is a sectional plan view of one corner of a railroad-car, showing two of the seats arranged as a couch for night use. Fig. 2 is a side elevation of one of the seats in the same position as shown in Fig. 1. Fig. 3 is a similar view, with the seat turned up for day use. Fig. 4 is a plan of one of the beds or supports of the seats. Fig. 5 is a rear elevation of Fig. 3. Fig. 6 is a view of the head-rest.

My improvement relates to convertible seats for railroad-cars, which can be used like ordinary seats in the day-time, but can be turned longitudinally and laid flatwise to form couches for night use.

The invention consists in the construction and arrangement of parts, as hereinafter more fully described and definitely claimed.

A represents one corner of a railroad-car, which has the seats B B arranged in tiers on opposite sides, leaving an alley-way in the center, as usual. In the day-time, when the seats are turned up, as shown in Fig. 3, they present the order and appearance of ordinary car-seats. Each of these seats consists of a seat proper, $a$, and a back, $b$, which are hinged together by any suitable hinges, $c\ c$, so that the parts composing the seat may be turned down flatwise, as shown in Fig. 1. The seats may be properly upholstered in any way so as not to interfere with the hinge motion.

$d\ d$ are the arms of the seats. They are attached at the ends of the seat portion $a$ by pivots or hinges $f\ f$, so that they can be turned up or down; and they have each an arm or extension, $g$, with a hole in the end, which arm projects back so far that when the back $b$ is turned up, as shown in Fig. 3, a pin, $h$, in the end of the back passes through the hole in the end of the arm and locks the seat and back together to hold them in proper position.

Any suitable spring-catch or locking device may be used in place of the pin and hole above described.

When the seats are turned down flatwise to form couches the arms are turned down, as shown in Fig. 2, so as to lie out of the way, as well as not to impede the turning of the seats in arranging the couches, as seats with the ordinary stiff arms could not be turned around with economy of space, and they would stand in the way when formed into a couch.

C C are the beds or supports for the seats. They each consist of a plain board or plank, $i$, with standards $k\ k$ at the ends, said standards being made fast to the floor or side of the car. In the top of each bed or support is made a longitudinal groove or slot, $m$, having at the outer end two branching offsets, $m'\ m'$. Through this slot passes a pivot or bolt, $n$, which attaches the seat to the support. This pivot is so loose that it allows the seat to be drawn out bodily on top of the support, and also to be turned around axially to any desired position, the pivot running and turning in the slot as the seat is adjusted. In day use the seat lies in line with the support. To arrange the seat for night use the seat is drawn out from the wall to the outer end of the slot, and is then swung around longitudinally upon the pivot. The arms of the seat are turned down and the back is then turned over flatwise, as shown in Fig. 1. The next seat is then operated in the same way, and the two seats form the length of the couch, upon which two persons may recline. All the seats may be arranged in this way, every two seats forming a couch for two persons. The offsets $m'\ m'$ at the ends of the slots allow the seats to be moved sidewise when drawn out, to avoid striking the next seat in turning, whereby the seats may be fitted closer together than could otherwise be the case; and they also accomplish the more important purpose of allowing end movement of any two seats toward each other when adjusted, so that the ends will abut and prevent the leaving of an open joint between the ends. This movement can be given in either direction by the use of the two opposite offsets.

*p p* are cams on the outer ends of the supports C, for the purpose of tightening or securing the seats in both the raised and depressed positions. These cams have handles, and are pivoted so that when the handles are depressed the cams will bear up against the seats and hold them fast in place.

*s s* are head-rests, employed at the head of every couch, as shown in Figs. 1 and 2. Each head-rest consists of a plain plate or board, having points or spurs *v v* on the lower edge and inner end, which enter corresponding sockets in the couch and the wall, by which the head-rest is held upright and in proper position. This construction enables the head-rest to be applied or removed at pleasure.

In order to prevent the arms from striking when turned down, I employ springs attached to the seat, and having jaws, which strike into grooves in the tops of the arms, of such shape that in raising the arms the springs will be forced out of the grooves, being thus self-adjusting. This is a convenience, as the arms are held firmly when turned down.

Having thus described my invention, I claim as new—

1. In a railroad-car, the seats B B, constructed in sections *a b*, forming the bottom and back, hinged together, as described, in combination with the platforms or supports C C, provided with the slots *m m*, through which pass the pivots *n n*, connecting the seats with the platforms, said slots having offsets *m' m'* at their outer ends, the whole arranged as described, so that the seats can be drawn out bodily on the supports, swung around at right angles and longitudinally with the car, and the hinged sections of the seat be laid flatwise to form a couch, as herein shown and described.

2. In a railroad-car, the combination of the seat B and its platform or support C, provided with the groove *m* in the platform, and having the offsets or branching slots *m' m'* at its outer end, whereby, when the seat is fully drawn out, its pivot *n* may fall back into one of said offsets, enabling the seat to be turned without striking the next seat, also enabling the ends of two adjoining seats to be abutted together when extended, as herein shown and described.

3. The combination, with the seat proper *a* and back *b*, hinged together so as to be laid flatwise, of the seat-arms *d d*, hinged to the ends of the seat and capable of a turning action, provided with the extension *g*, which, when the back is turned up, engages with said back and locks it in place, as herein shown and described.

4. The combination, with the adjustable seat B and its support C, of the cam or eccentric *p*, pivoted to the end of the support and resting under the seat, and serving to tighten or secure the seat to the support at any adjustment, as herein shown and described.

In testimony whereof I have hereunto set my hand this 30th day of August, 1877.

NORMAN B. SHERWOOD.

Witnesses:
  GEORGE H. RICE,
  SAML. V. SMITH.